United States Patent
Takasugi

(10) Patent No.: US 12,283,268 B2
(45) Date of Patent: Apr. 22, 2025

(54) INFORMATION PROCESSING APPARATUS AND INFORMATION PROCESSING METHOD

(71) Applicant: Nissan Motor Co., Ltd., Kanagawa (JP)

(72) Inventor: Chikao Takasugi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 344 days.

(21) Appl. No.: 18/003,765

(22) PCT Filed: Jun. 30, 2020

(86) PCT No.: PCT/JP2020/025659
§ 371 (c)(1),
(2) Date: Dec. 29, 2022

(87) PCT Pub. No.: WO2022/003822
PCT Pub. Date: Jan. 6, 2022

(65) Prior Publication Data
US 2023/0290334 A1     Sep. 14, 2023

(51) Int. Cl.
*G06F 3/048* (2013.01)
*G10L 15/00* (2013.01)

(52) U.S. Cl.
CPC .................. *G10L 15/00* (2013.01)

(58) Field of Classification Search
None
See application file for complete search history.

(56) References Cited

U.S. PATENT DOCUMENTS

| | | | |
|---|---|---|---|
| 2018/0181359 A1* | 6/2018 | Monroe | G06F 3/0488 |
| 2019/0011926 A1* | 1/2019 | Konishi | G01C 21/3476 |
| 2019/0225267 A1* | 7/2019 | Ohtani | G06V 20/586 |
| 2019/0228767 A1* | 7/2019 | Kim | G10L 15/02 |
| 2020/0051554 A1 | 2/2020 | Kim et al. | |
| 2020/0135193 A1 | 4/2020 | Hayashi | |
| 2020/0156641 A1* | 5/2020 | Kretschmann | B60W 50/0097 |
| 2020/0411015 A1* | 12/2020 | Kim | G06V 10/764 |

(Continued)

FOREIGN PATENT DOCUMENTS

| | | |
|---|---|---|
| EP | 3567584 A1 | 11/2019 |
| JP | 2001-216130 A | 8/2001 |

(Continued)

*Primary Examiner* — Jakieda R Jackson
(74) *Attorney, Agent, or Firm* — Osha Bergman Watanabe & Burton LLP

(57) ABSTRACT

An information processing apparatus includes a voice data input device (a microphone) to which voice data is input; a user data input device (an input device) to which user data is input from a user; and a controller. The controller recognizes first voice data input to the voice data input device (the microphone), outputs second voice data indicating that predetermined equipment is to be controlled based on a recognition result the first voice data, and controls the predetermined equipment based on the recognition result after the second voice data is notified, but stops controlling the predetermined equipment if user data indicating that control of the predetermined equipment is to be stopped is received during a time period when the second voice data is being notified.

10 Claims, 9 Drawing Sheets

(56) References Cited

U.S. PATENT DOCUMENTS

| | | | |
|---|---|---|---|
| 2021/0182740 A1* | 6/2021 | Han | G06N 5/04 |
| 2021/0398543 A1* | 12/2021 | Tan | G06F 16/248 |
| 2023/0290334 A1 | 9/2023 | Takasugi | |

FOREIGN PATENT DOCUMENTS

| | | |
|---|---|---|
| JP | 2003-208196 A | 7/2003 |
| JP | 2007-286174 A | 11/2007 |
| JP | 2009-069202 A | 4/2009 |
| JP | 2013-007917 A | 1/2013 |
| JP | 2020-069920 A | 5/2020 |
| WO | 2022003822 A1 | 1/2022 |

* cited by examiner

INFORMATION PROCESSING APPARATUS AND INFORMATION PROCESSING METHOD

TECHNICAL FIELD

The present invention relates to an information processing apparatus and an information processing method.

BACKGROUND ART

There is a conventionally known invention in which equipment such as a remote controller is controlled by using a user's voice (Patent Literature 1). In the invention disclosed in Patent Literature 1, the user's voice is recognized and control content corresponding to a user's command is displayed on the remote controller. The user checks the control content displayed on the remote controller, and the control is performed by the user approving the control content.

CITATION LIST

Patent Literature

[Patent Literature 1] Japanese Unexamined Patent Application Publication No. 2007-286174

SUMMARY OF THE INVENTION

Problems to be Solved by the Invention

However, the invention disclosed in Patent Literature 1 has a problem that it takes time until the control is actually performed because the user is required to check and approve the control content.

The present invention has been devised in view of the above problem, and an object of the present invention is to provide an information processing apparatus and an information processing method in which control is stopped only when necessary and control is automatically performed promptly unless a stop instruction is received.

Means for Solving the Problem

An information processing apparatus according to one aspect of the present invention recognizes first voice data input to a voice data input device; outputs second voice data indicating that predetermined equipment is to be controlled based on a recognition result of the first voice data; and controls the predetermined equipment based on the recognition result after the second voice data is notified, but stops controlling the predetermined equipment if user data indicating that control of the predetermined equipment is to be stopped is received during a time period when the second voice data is being notified.

Advantageous Effect of the Invention

According to the present invention, control is stopped only when necessary, and control is automatically performed promptly unless there is a stop instruction.

MODES FOR CARRYING OUT THE INVENTION

Figure 1:
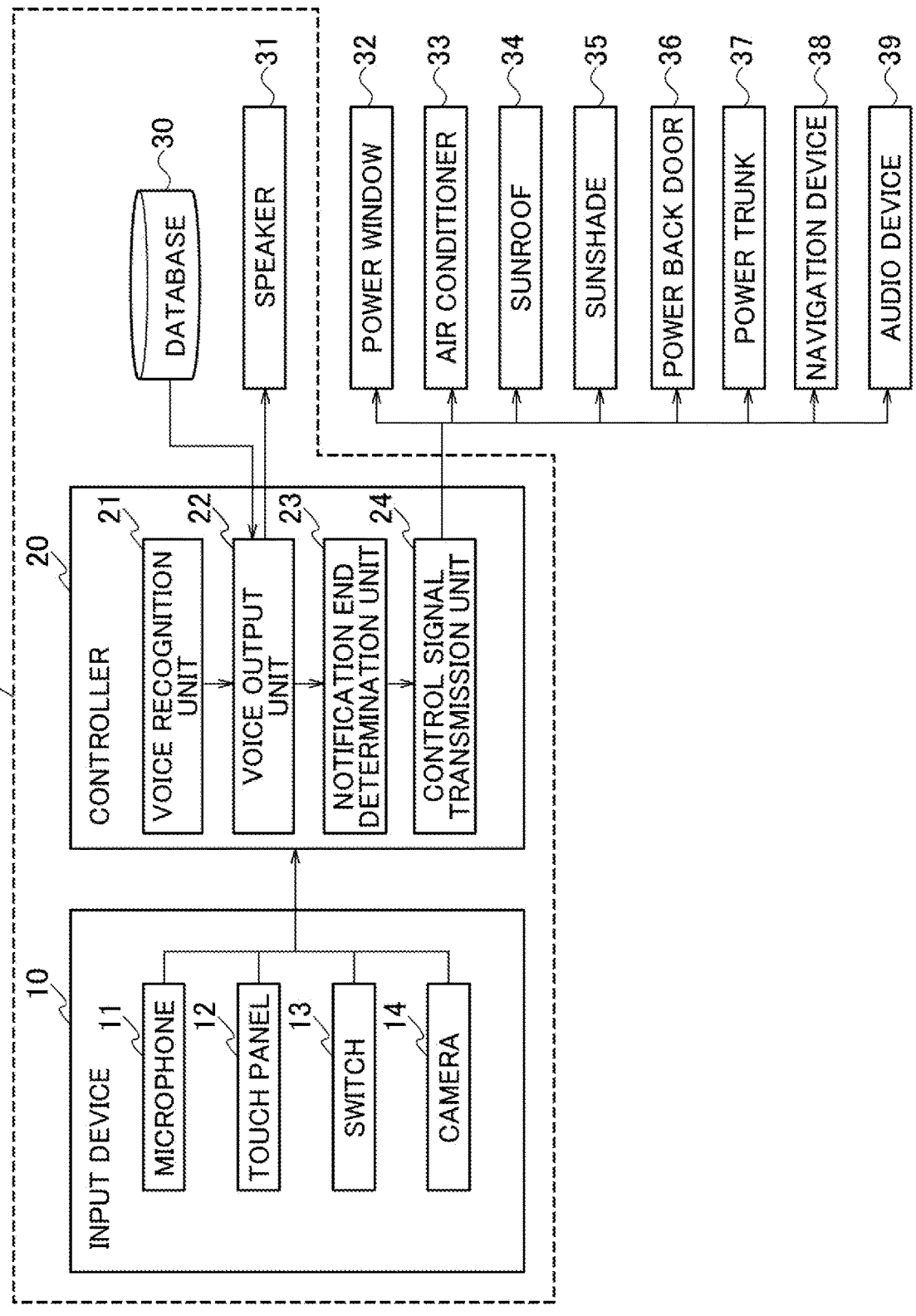
FIG. 1 is a diagram showing a configuration of an information processing apparatus 1 according to an embodiment of the present invention.

An embodiment of the present invention will be described below with reference to the drawings. In the description of the drawings, the same parts are denoted by the same reference numerals and the explanation thereof is omitted.

An example of the configuration of an information processing apparatus 1 according to the present embodiment will be described with reference to FIG. 1. The information processing apparatus 1 is mounted in a vehicle as an example. As shown in FIG. 1, the information processing apparatus 1 includes input devices 10, a controller 20, a database 30, and a speaker 31.

The input devices 10 are a generic term for equipment that receives data transmitted from a user riding in the vehicle. As shown in FIG. 1, the input devices 10 include a microphone 11, a touch panel 12, switches 13, and a camera 14. A user's voice data is input to the microphone 11. The microphone 11 is installed near the driver's seat, for example. The touch panel 12 receives input through a user's touch operation. The touch panel 12 is mainly used as a display of a navigation device. The switches 13 are disposed on a steering wheel and receive a user's input (switch on). The camera 14 is installed near the driver's seat, for example, and captures images of the posture, gestures, and the like of the user. Data input to the input devices 10 is transmitted to the controller 20.

The controller 20 is a general-purpose computer having a central processing unit (CPU), a memory, a storage device, an input/output unit, and the like. The controller 20 processes data acquired from the input devices 10. Specifically, the CPU reads various programs stored in the storage device into the memory and executes various commands of the program. This causes the controller 20 to function as a plurality of information processing circuits of the information processing apparatus 1. The controller 20 includes a voice recognition unit 21, a voice output unit 22, a notification end determination unit 23, and a control signal transmission unit 24 as the plurality of information processing circuits.

The voice recognition unit 21 recognizes the user's voice data input to the microphone 11. Known techniques such as frequency analysis are used for voice recognition. The voice recognition unit 21 outputs the recognition result to the voice output unit 22.

The voice output unit 22 refers to a database 30 and acquires feedback voice data corresponding to the recognition result of the voice recognition unit 21. The feedback voice data is data which prompts the user to confirm the content of control to be performed on predetermined equipment. If the user's voice data is recognized as "Open the driver's seat window", the corresponding feedback voice data would be "Opening the driver's seat window", for example. A plurality of pieces of feedback voice data are prepared in advance and stored in the database 30. In the present embodiment, the database 30 is described as being stored in a storage device different from the storage device of the controller 20, but the storage place is not limited to this. The database 30 may be stored in the storage device of the controller 20.

The voice output unit 22 notifies the user of feedback voice data by using the speaker 31. The voice output unit 22 may generate feedback voice data each time based on the recognition result of the voice recognition unit 21. As the generation method, it is sufficient if the device is programmed to generate voice data that responds to the user's voice data in parrot fashion.

When the output of the feedback voice data starts, the voice output unit 22 transmits a signal indicating that the output of the data has started to the notification end determination unit 23. When the output of the feedback voice data ends, the voice output unit 22 transmits a signal indicating that the output of the data has ended to the notification end determination unit 23. In the following, a signal indicating the start is sometimes simply referred to as a start signal. Similarly, a signal indicating the end is sometimes simply referred to as an end signal.

The notification end determination unit 23 determines whether the notification by means of the voice output unit 22 has ended. Specifically, if the notification end determination unit 23 receives the end signal after receiving the start signal from the voice output unit 22, the notification end determination unit 23 determines that the notification by means of the voice output unit 22 has ended. Meanwhile, if the notification end determination unit 23 has received the start signal from the voice output unit 22 but does not receive the end signal thereafter, the notification end determination unit 23 determines that the notification by means of the voice output unit 22 has not ended. When the notification end determination unit 23 determines that the notification by means of the voice output unit 22 has ended, the notification end determination unit 23 transmits a signal indicating that the notification has ended to the control signal transmission unit 24.

If the control signal transmission unit 24 receives a signal indicating that notification has ended from the notification end determination unit 23, the control signal transmission unit 24 controls predetermined equipment based on a user's instruction (voice data) obtained by means of the recognition result of the voice recognition unit 21. Predetermined equipment is mounted in the vehicle and includes, as shown in FIG. 1, a power window 32, an air conditioner 33, a sunroof 34, a sunshade 35, a power back door 36, a power trunk 37, a navigation device 38, an audio device 39, and the like. As an example, if the user's instruction is "Open the driver's seat window", the control signal transmission unit 24 transmits a signal for opening the window to the power window 32 of the driver's seat. The power window 32 automatically opens the window based on the received signal. The predetermined equipment may include equipment that performs travel control such as automated driving.

Next, an operation example of the information processing apparatus 1 will be described with reference to FIGS. 2 to 9.

Figure 2:
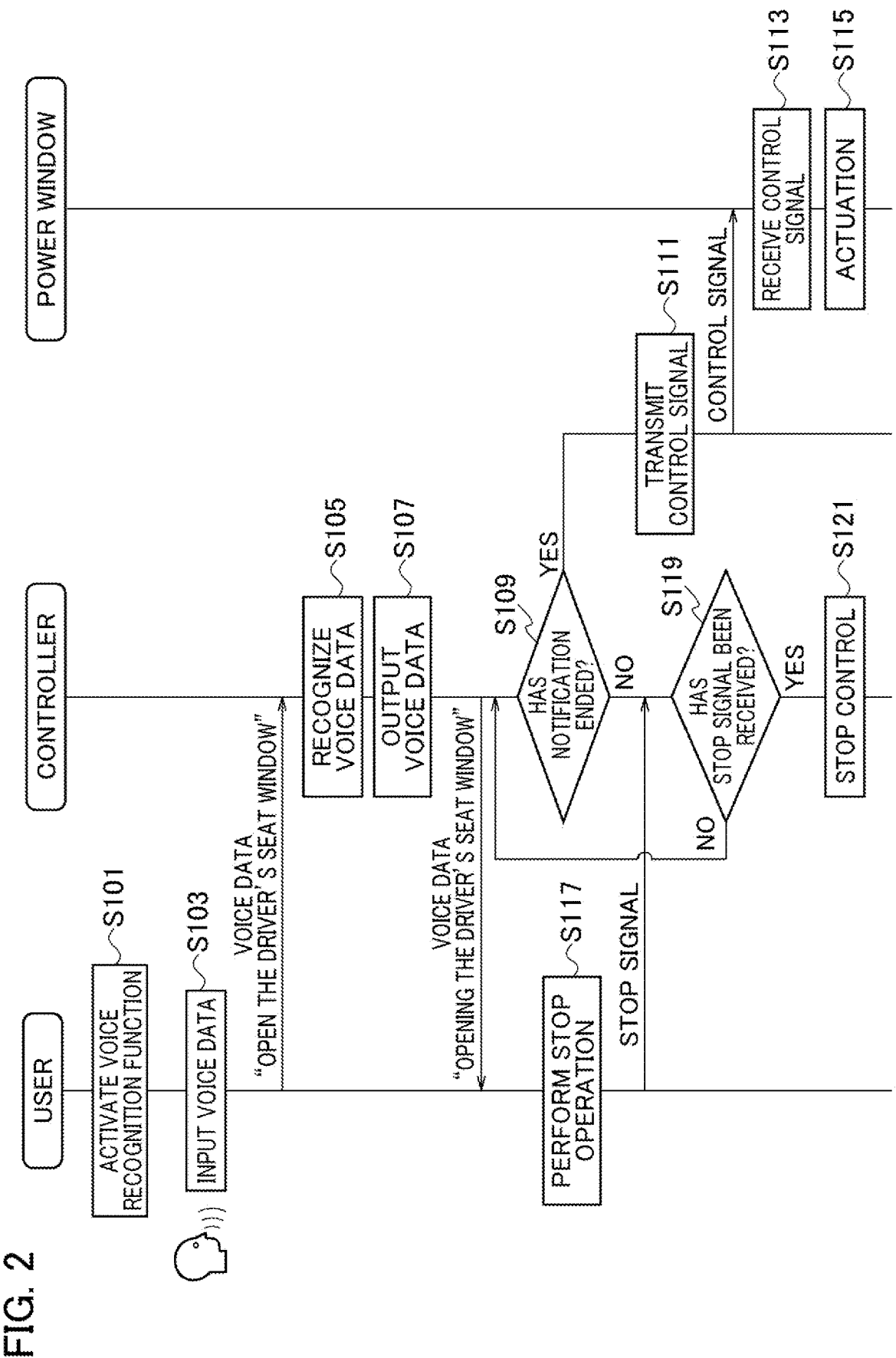
FIG. 2 is a sequence diagram for explaining one operation example of an information processing apparatus 1 according to an embodiment of the present invention.
Figure 3:
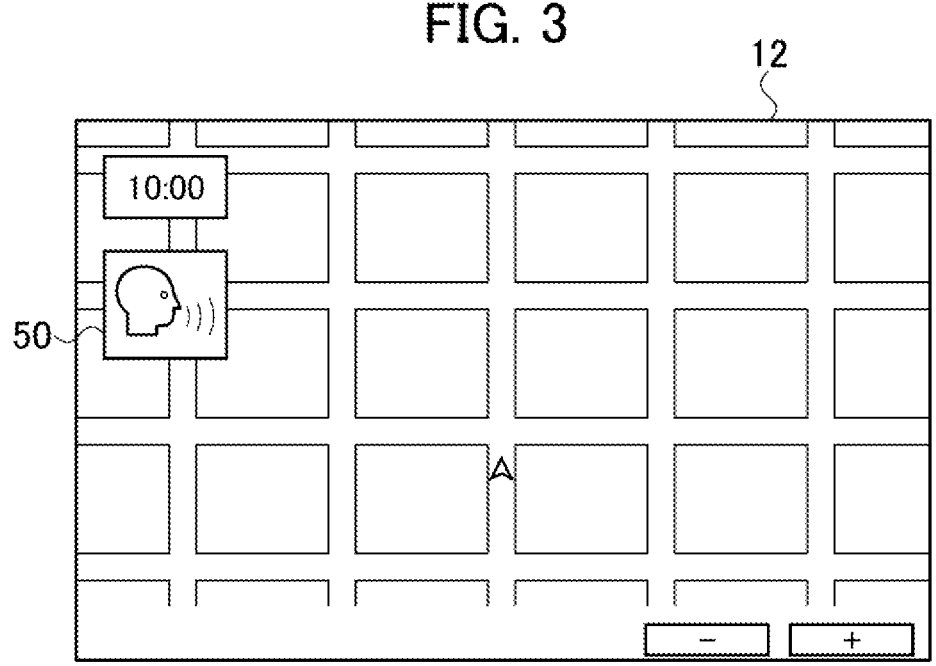
FIG. 3 is a diagram for explaining a display example of a display 12.

In step S101 shown in FIG. 2, the user riding in the vehicle activates the voice recognition function. In the present embodiment, the voice recognition function is not always activated. The voice recognition function is activated by means of the user's instruction. An example of an activation method of the voice recognition function will be described with reference to FIG. 3. As shown in FIG. 3, while the vehicle is travelling, route guidance provided by the navigation device 38 is displayed on the touch panel 12. An icon 50 indicating speaking is displayed on the touch panel 12. The voice recognition function is activated by the user touching and operating the icon 50. As another activation method, the switches 13 provided on the steering wheel may have an activation trigger function, or the voice recognition function may be activated by using the recognition of the user's speech relating to a predetermined keyword as a trigger.

Figure 4:
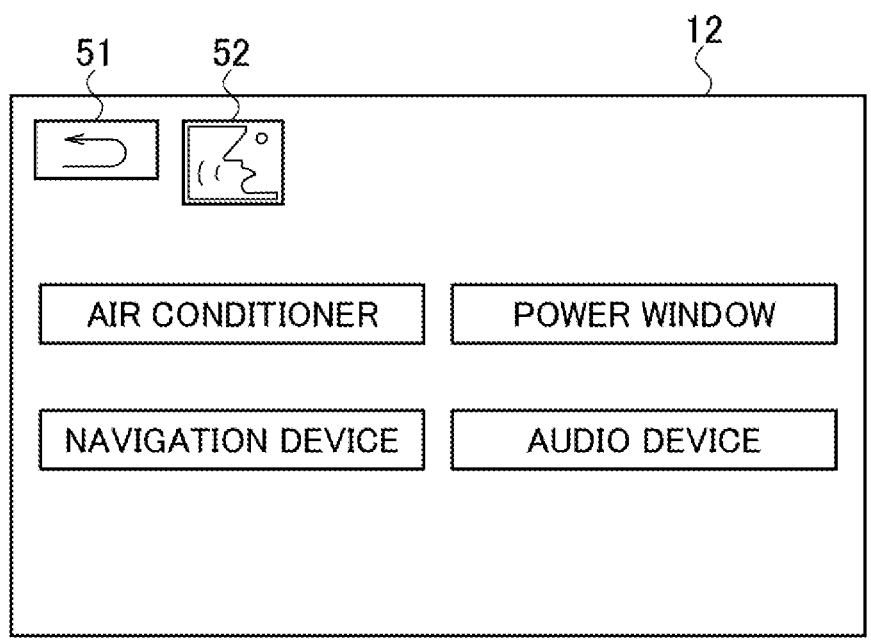
FIG. 4 is a diagram showing that a voice recognition function has been activated.
Figure 5:
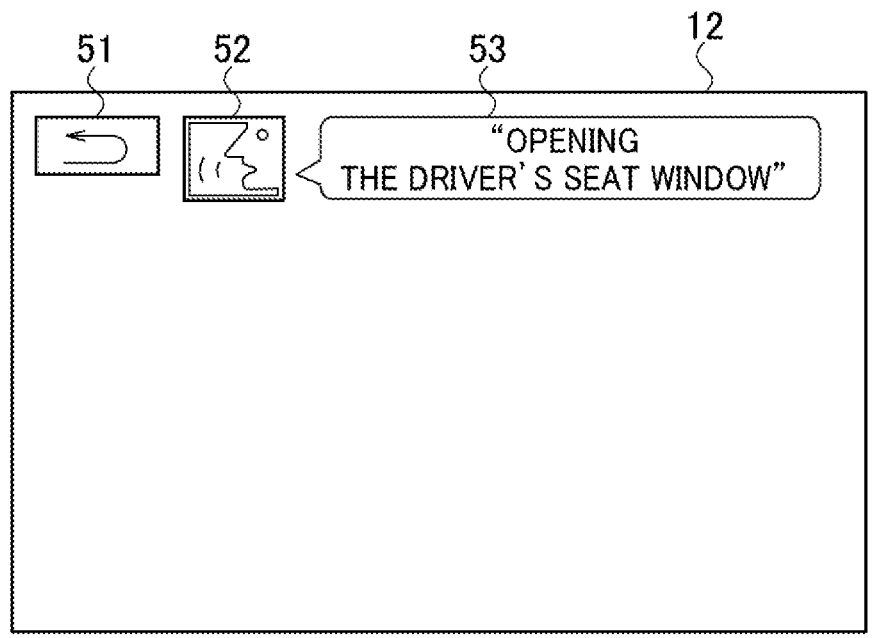
FIG. 5 is a display example during a time period when feedback voice data is being notified from a speaker 31.

After the voice recognition function is activated, the display on the touch panel 12 is switched to the content shown in FIG. 4. As shown in FIG. 4, after the voice recognition function is activated, the touch panel 12 displays an icon 51, an icon 52, and pieces of equipment that can be instructed by means of voice. FIG. 4 shows an air conditioner, a power window, a navigation device, and an audio device as the pieces of equipment that can be instructed by means of voice, but they are examples.

The icon 52 shown in FIG. 4 indicates that voice recognition is possible. After checking that the icon 52 is displayed on the touch panel 12, the user inputs an instruction for actuating the predetermined equipment by using voice. That is, as shown in step S103 of FIG. 2, the user inputs voice data to the microphone 11. In FIG. 2, the user's instruction is "Open the driver's seat window".

Processing proceeds to step S105, and the voice recognition unit 21, which has acquired the user's voice data, recognizes the voice data. Processing proceeds to step S107, and the voice output unit 22 refers to the database 30 and acquires feedback voice data corresponding to the recognition result of the voice recognition unit 21. The user's instruction is recognized as "Open the driver's seat window". Therefore, the data "Opening the driver's seat window" is selected as the feedback voice data. The voice output unit 22 notifies the user of the feedback voice data by using the speaker 31. When notification of the feedback voice data is started, that is, when the output of the feedback voice data is started from the speaker 31, the display of the touch panel 12 is switched to the content shown in FIG. 5.

Processing proceeds to step S109, and the notification end determination unit 23 determines whether the notification by means of the voice output unit 22 has ended. If the notification end determination unit 23 receives the end signal after receiving the start signal from the voice output unit 22, the notification end determination unit 23 determines that the notification by means of the voice output unit 22 has ended. In FIG. 2, the end of the notification by means of the voice output unit 22 means the end of the output of the voice data "Opening the driver's seat window".

If the notification end determination unit 23 has received the start signal from the voice output unit 22 but does not receive the end signal thereafter, the notification end determination unit 23 determines that the notification by means of the voice output unit 22 has not ended. In other words, if the notification end determination unit 23 has received the start signal from the voice output unit 22 but does not receive the end signal thereafter, the notification end determination unit 23 determines that feedback voice data is being notified from the speaker 31.

If the notification end determination unit 23 determines that the notification by means of the voice output unit 22 has ended (NO in step S109), processing proceeds to step S111. In step S111, the notification end determination unit 23 transmits a signal indicating that notification has ended to the control signal transmission unit 24. The control signal transmission unit 24 that has received this signal transmits a control signal for opening the window to the power window 32 of the driver's seat. Processing proceeds to step S113, and the power window 32 having received the control signal automatically opens the window (step S115).

Meanwhile, if the notification end determination unit 23 determines that the notification by means of the voice output unit 22 has not ended (YES in step S109), processing proceeds to step S119.

In step S119, if the controller 20 receives a signal indicating that control is to be stopped from the user during a time period when the feedback voice data is being notified from the speaker 31 (YES in step S119), the controller 20 stops controlling the predetermined equipment (step S121). The signal indicating that control is to be stopped (hereinafter sometimes simply referred to as a stop signal) will be described. The stop signal is a signal transmitted to the controller 20 when the user performs a predetermined operation. When the user gives the instruction "Open the driver's seat window" by using voice, the user receives the feedback "Opening the driver's seat window" via the speaker 31. If there is an error in voice recognition at this time, it is assumed that the user desires to stop the control. In the example shown in FIG. 2, the user's voice instruction is correctly recognized. However, it is possible that the user's voice instruction is not correctly recognized, as in the case of "Opening the passenger seat window". In such a case, it is assumed that the user desires to stop the control.

In the present embodiment, during a time period when the feedback voice data is being notified from the speaker 31, the user can transmit a stop signal to the controller 20 in a plurality of ways to stop the control by means of the controller 20. Meanwhile, if the notification by means of the voice output unit 22 has ended, the user can no longer transmit the stop signal to the controller 20, or even if the user can transmit the stop signal, the controller 20 does not accept the stop signal. Therefore, in order to stop the control by means of the controller 20, the user needs to perform a predetermined operation during a time period when the feedback voice data is being notified from the speaker 31. The time period when the feedback voice data is being notified from the speaker 31 is defined as a time period from when the notification end determination unit 23 receives the start signal from the voice output unit 22 to when the notification end determination unit 23 receives the end signal.

A description will be given regarding a predetermined operation performed by the user in order to stop the control by means of the controller 20 with reference to FIGS. 6 to 9.

Figure 6:
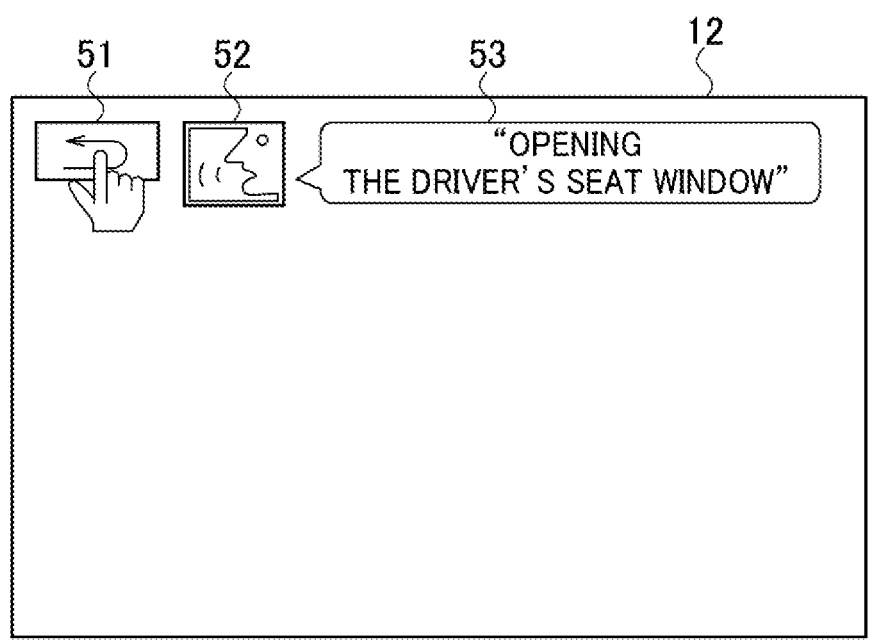
FIG. 6 is a diagram for explaining an example of an operation performed by a user to stop control by means of a controller 20.

As shown in FIG. 6, the user can stop the control by means of the controller 20 by touching the icon 51 displayed on the touch panel 12. Specifically, if the user touches the icon 51 during the time period when the feedback voice data is being notified from the speaker 31, the stop signal is transmitted to the controller 20. The controller 20 having received the stop signal does not transmit a control signal for opening the window to the power window 32. This stops the control by means of the controller 20. The icon 51 is what is referred to as a return icon.

Figure 7:
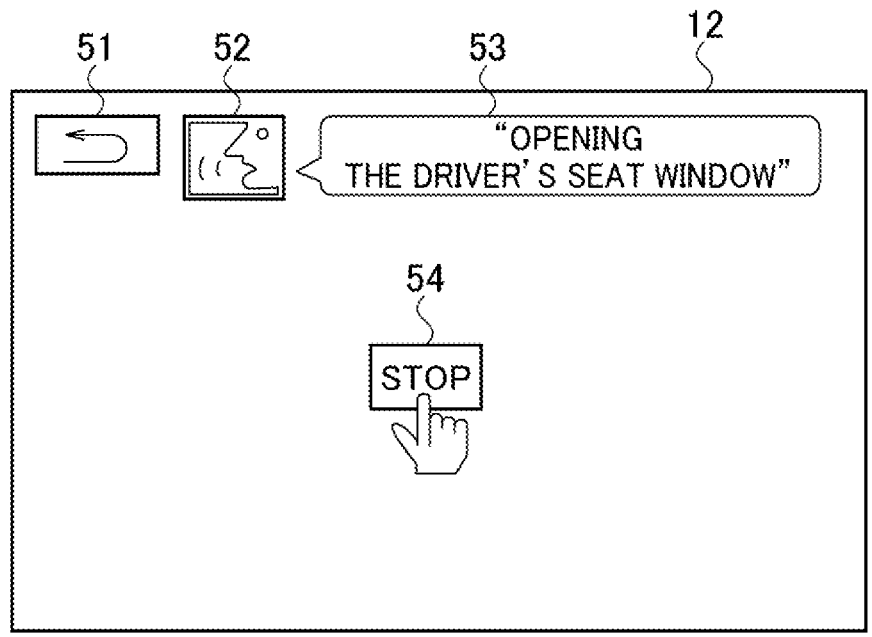
FIG. 7 is a diagram for explaining another example of an operation performed by a user to stop control by means of a controller 20.

As shown in FIG. 7, the user can stop the control by means of the controller 20 by touching the icon 54 displayed on the touch panel 12. Specifically, if the user touches the icon 54 during the time period when the feedback voice data is being notified from the speaker 31, the stop signal is transmitted to the controller 20. The word "Stop" is displayed on the icon 54.

Figure 8:
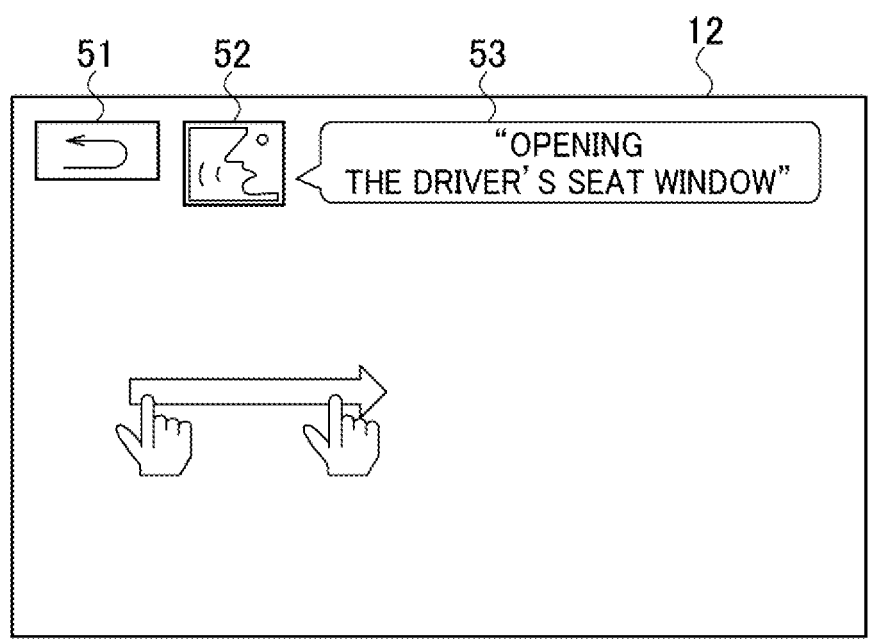
FIG. 8 is a diagram for explaining another example of an operation performed by a user to stop control by means of a controller 20.

In addition, as shown in FIG. 8, the user can stop the control by means of the controller 20 by swiping the touch panel 12. The term swiping means an operation of sliding a finger while touching the touch panel 12. If the user swipes the touch panel 12 during the time period when the feedback voice data is being notified from the speaker 31, the stop signal is transmitted to the controller 20. In the example shown in FIG. 8, the user swipes the touch panel from left to right, but the swiping direction is not limited thereto. The user can also swipe the touch panel down from the top or right to left. Regardless of the swiping direction, if the user swipes the touch panel during the time period when the feedback voice data is being notified from the speaker 31, the stop signal is transmitted to the controller 20.

Figure 9:
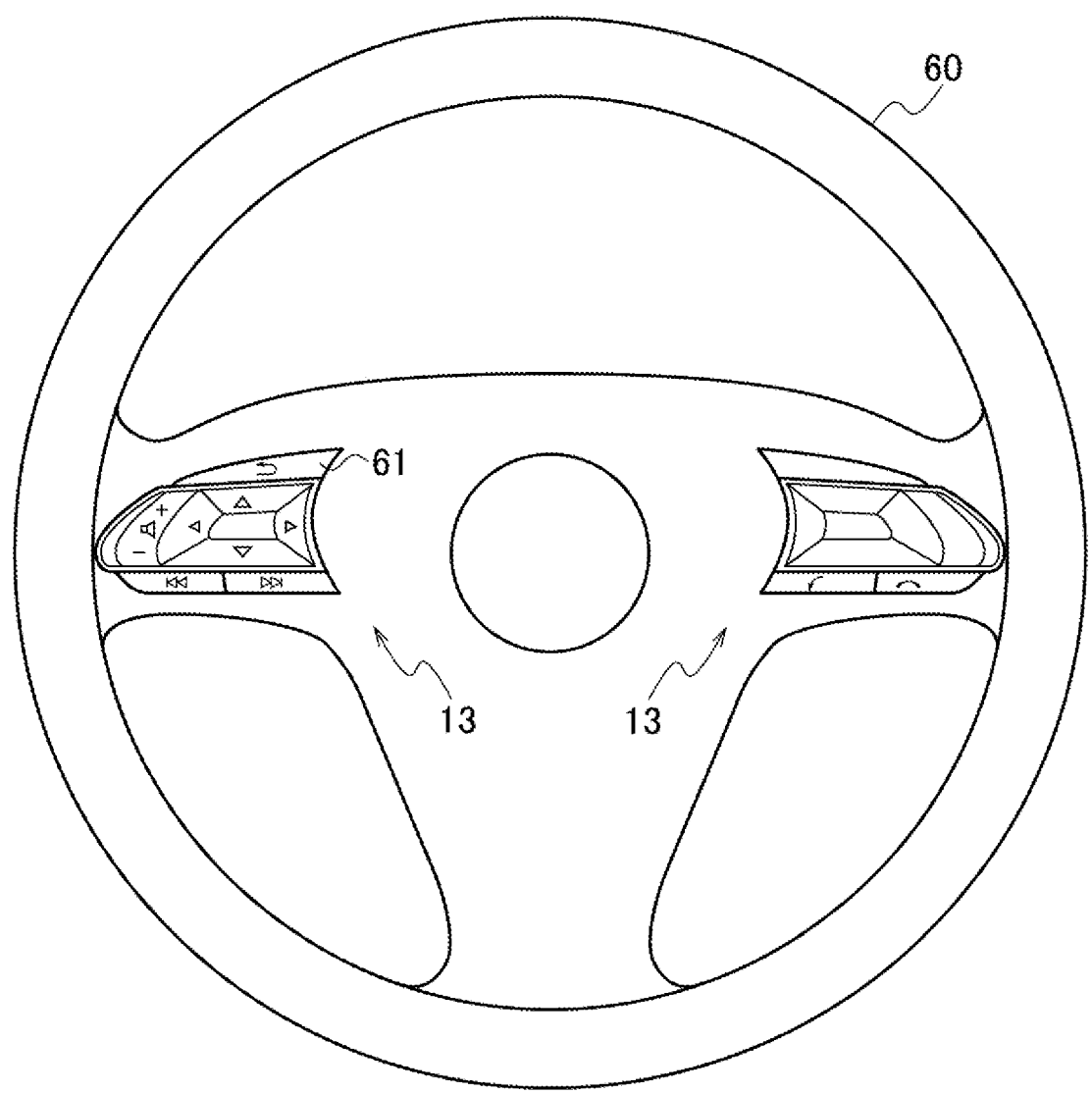
FIG. 9 is a diagram for explaining another example of an operation performed by a user to stop control by means of a controller 20.

In addition, as shown in FIG. 9, the user can stop the control by means of the controller 20 by pressing a specific switch (a switch 61 in FIG. 9) among the switches 13 provided on a steering wheel 60. Specifically, if the user presses the switch 61 during the time period when the feedback voice data is being notified from the speaker 31, the stop signal is transmitted to the controller 20. The switch 61 is what is referred to as a return switch.

In addition, the user can use voice to stop the control by the controller 20. Specifically, if the user gives an instruction with voice by saying "stop" toward the microphone 11 during the time period when the feedback voice data is being notified from the speaker 31, the control by means of the controller 20 is stopped. When voice data is input during the time period when the feedback voice data is being notified from the speaker 31, the voice recognition unit 21 recognizes the input voice data. If the recognized voice data indicates that the control is to be stopped, the controller 20 stops the control. In this case, the voice data input during the time period when the feedback voice data is being notified from the speaker 31 serves as the stop signal.

As another example, the user can use a gesture to stop the control by means of the controller 20. Specifically, if the user makes a gesture indicating stop in front of the camera 14 during the time period when the feedback voice data is being notified from the speaker 31, the stop signal is transmitted to the controller 20. An example of the gesture indicating stop is a gesture of placing a hand in front of the camera 14. If image data is input from the camera 14 during the time period when the feedback voice data is being notified from the speaker 31, the controller 20 analyzes the image data. If a gesture indicating stop is detected from the image data, the controller 20 stops the control. In this case, the image data input during the time period when the feedback voice data is being notified from the speaker 31 serves as the stop signal.

The reason why the user desires to stop the control is not limited to misrecognition of voice data. The user may desire to cancel an instruction, for example. That is, a case is conceivable in which although the user gives an instruction with voice to "Open the driver's seat window", thereafter the user may simply desire to cancel the instruction. In such a case also, as described above, it is sufficient if the user performs a predetermined operation during the time period when the feedback voice data is being notified from the speaker 31.

Returning to FIG. 2, in step S117, if the user performs an operation for transmitting the stop signal during the time period when the feedback voice data is being notified from the speaker 31, the stop signal is transmitted to the controller 20.

Descriptions of steps S119 and S121 have already been made. The example shown in FIG. 2 is a case in which the stop signal is transmitted, but it is needless to say that there is also a case in which the stop signal is not transmitted. If the user does not make any action during the time period when the feedback voice data is being notified from the speaker 31, it is needless to say that the stop signal is not transmitted. In this case, the window is opened immediately after the notification has ended.

In step S109 of FIG. 2, the end of the notification by means of the voice output unit 22 means the end of the notification without transmission of the stop signal from the user during the time period when the feedback voice data is being notified from the speaker 31.

In the above, it has been described that the user can no longer transmit the stop signal to the controller 20 when the notification by means of the voice output unit 22 has ended, but a supplementary explanation will be given below. When the notification by means of the voice output unit 22 has ended, the display on the touch panel 12 switches from the content shown in FIG. 5 to the content shown in FIG. 3. Therefore, when the notification by means of the voice output unit 22 has ended, the user is not able to transmit the stop signal by using the touch panel 12.

Action and Effect

As described above, in accordance with the information processing apparatus 1 according to the present embodiment, the following actions and effects can be obtained.

The information processing apparatus 1 includes a voice data input device (the microphone 11) to which voice data of a user riding in a vehicle is input, a user data input device (the microphone 11, the touch panel 12, the switches 13, and the camera 14) to which user data is input from the user, and the controller 20. The controller 20 recognizes first voice data input to the voice data input device. The first voice data is voice data indicating an instruction for actuating predetermined equipment, and one example thereof is "Open the driver's seat window" described above. The controller 20 outputs, from the speaker 31, second voice data indicating that the predetermined equipment is to be controlled based on the recognition result of the first voice data. One example of the second voice data is "Opening the driver's seat window" described above.

After the second voice data is notified, the controller 20 controls the predetermined equipment based on the recognition result. Meanwhile, the controller 20 stops the control of the predetermined equipment if user data indicating that control of the predetermined equipment is to be stopped is input while the second voice data is being notified. The user data indicating that control is to be stopped is the stop signal described above. According to the information processing apparatus 1 having this kind of configuration, control is automatically performed promptly, unless the user transmits a stop instruction after giving feedback to the user. Further, the user can stop the control when necessary.

The predetermined equipment is equipment mounted in a vehicle. The predetermined equipment includes at least any one of the power window 32, the air conditioner 33, the sunroof 34, the sunshade 35, the power back door 36, the power trunk 37, the navigation device 38, and the audio device 39.

The notification given by using the second voice data is a notification indicating that the predetermined equipment will be controlled. As an example, the notification by using the second voice data is a notification indicating that the window of the power window 32 will be opened.

If the notification by using the second voice data ends without receiving the user data indicating that control of the predetermined equipment is to be stopped, the controller 20 performs the control of the predetermined equipment. In this way, the control is automatically performed promptly unless the user transmits a stop instruction after giving feedback to the user. Further, if the notification by using the second voice data ends without receiving the user data indicating that control of the predetermined equipment is to be stopped, the controller 20 performs the control of the predetermined equipment without accepting other user data.

The user data is data indicating that the user has operated the touch panel 12, image data obtained by capturing an image of the user's posture, data indicating that the user has operated the switch 61 provided on the steering wheel, or voice data input to the voice data input device.

A time period after the second voice data is notified is defined as a time period after the output of the second voice data ends. A time period during which the second voice data is being notified is defined as a time period from the start to the end of the output of the second voice data.

Modified Example

Next, a modified example of the present embodiment will be described with reference to FIG. 10.

An information processing apparatus 2 according to a modified example further includes an identification unit 25 and a waiting time setting unit 26 in comparison with the information processing apparatus 1. The parts that duplicate those of the information processing apparatus 1 are denoted by the same reference numerals, and a description of the duplicate parts is omitted. The differences between the information processing apparatuses 1 and 2 are mainly explained below.

The identification unit 25 identifies a usable device for the user among the input devices 10. The usable device here means a device which is usable to stop the control by means of the controller 20. That is, the usable device means a device that is usable during the time period when the feedback voice data is being notified from the speaker 31.

Figure 10:
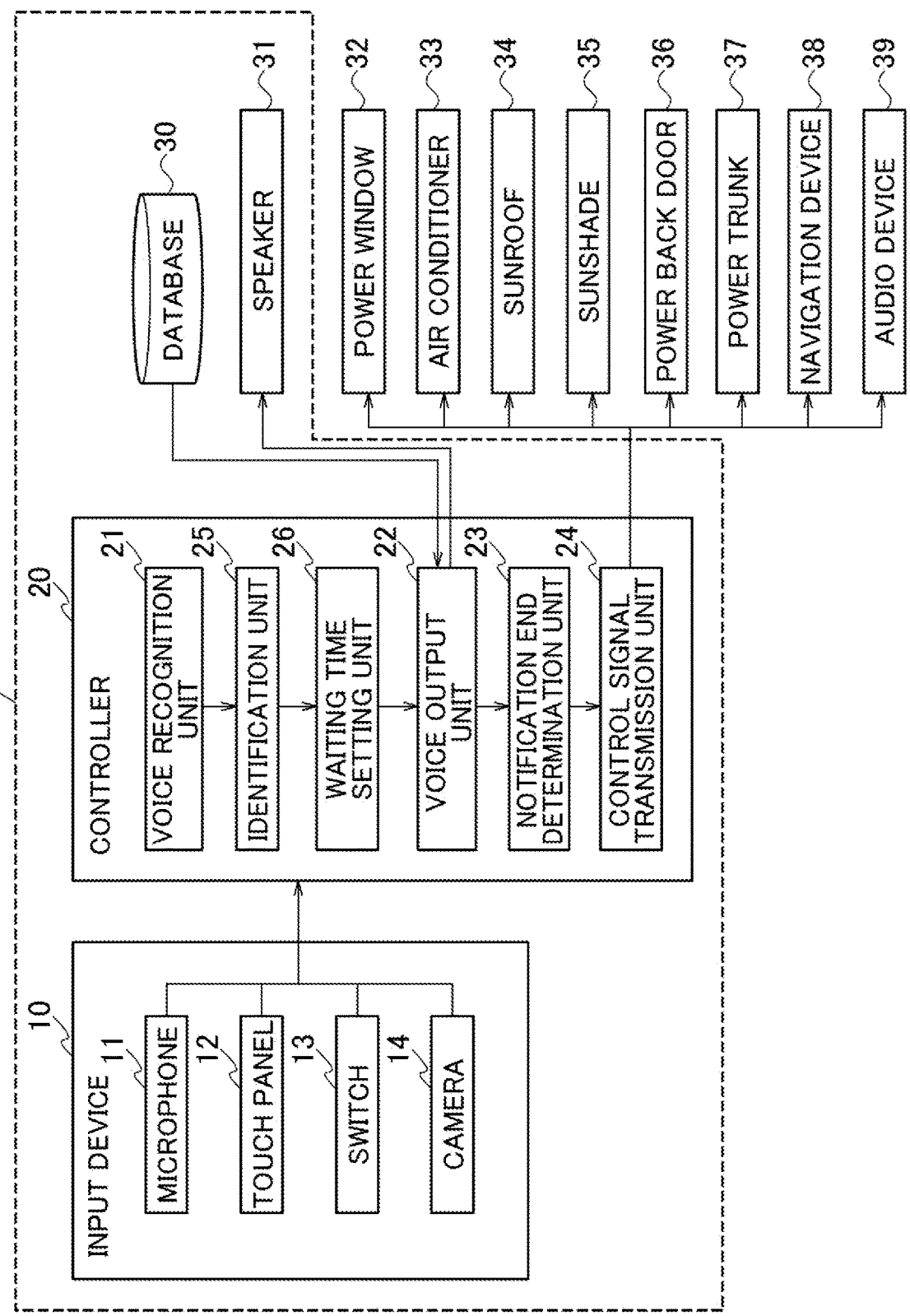
FIG. 10 is a diagram showing a configuration of an information processing apparatus 2 according to a modified example of the present invention.

FIG. 10 shows the microphone 11, the touch panel 12, the switches 13, and the camera 14 as the input devices 10. However, not all of the devices are always usable. The devices may not be usable for reasons such as a malfunction. Alternatively, the devices could be unusable due to some restrictions. As a way of identifying whether the devices are usable, it is possible to determine whether there is a signal indicating that the devices are operating normally.

Suppose that the identification unit 25 receives a signal indicating that the microphone 11, the touch panel 12, the switches 13, and the camera 14 are operating normally. In the above case, the identification unit 25 identifies that the devices are usable during the time period when the feedback voice data is being notified from the speaker 31. The identification unit 25 transmits a signal indicating an identification result to the waiting time setting unit 26.

The waiting time setting unit 26 sets a waiting time based on the signal received from the identification unit 25. The waiting time is the time during which the stop signal from the user is accepted after the notification by means of the voice output unit 22 has ended. In the above embodiment, it has been described that the controller 20 does not accept the stop signal when the notification by means of the voice output unit 22 has ended. However, in the modified example, the stop signal is accepted during the set waiting time even after the notification by means of the voice output unit 22 has ended. Suppose that the notification by means of the voice output unit 22 is 2 seconds and the waiting time set by means of the waiting time setting unit 26 is 3 seconds, for example. In the above case, in the modified example, the time during which the user can transmit the stop signal is 5 seconds (2 seconds+3 seconds).

Next, a description will be given regarding how to set the waiting time. The waiting time is set depending on a usable device identified by means of the identification unit 25. Suppose that the only device identified as usable is the camera 14, for example. In this case, the waiting time is set to be the longest compared to when other devices are identified. The reason why the waiting time is set to be the longest is because the user has to place a hand in front of the camera 14 in order to transmit the stop signal, and the time required for this operation needs to be ensured. This waiting time is referred to as a first waiting time.

Subsequently, suppose that the only device identified as usable is the microphone 11. In this case, the waiting time is set to be shorter compared to when the camera 14 is identified. This is because the time required for speaking is shorter compared to the operation of placing a hand in front of the camera 14. This waiting time is referred to as a second waiting time.

Subsequently, suppose that the only device identified as usable is the touch panel 12. In this case, the waiting time is set to be shorter compared to when the camera 14 is identified. This is because the time required for the operation of the touch panel 12 is shorter compared to the operation of placing a hand in front of the camera 14. This waiting time is referred to as a third waiting time.

Subsequently, suppose that the only device identified as usable is a switch 13 (the switch 61). In this case, the waiting time is set to be shorter compared to when the camera 14 is identified. This is because the time required for the operation of the switch 61 is shorter compared to the operation of placing a hand in front of the camera 14. This waiting time is called a fourth waiting time.

The relationship among the first to fourth waiting times is as follows: the first waiting time>the second waiting time>the third waiting time>the fourth waiting time.

Figure 11:
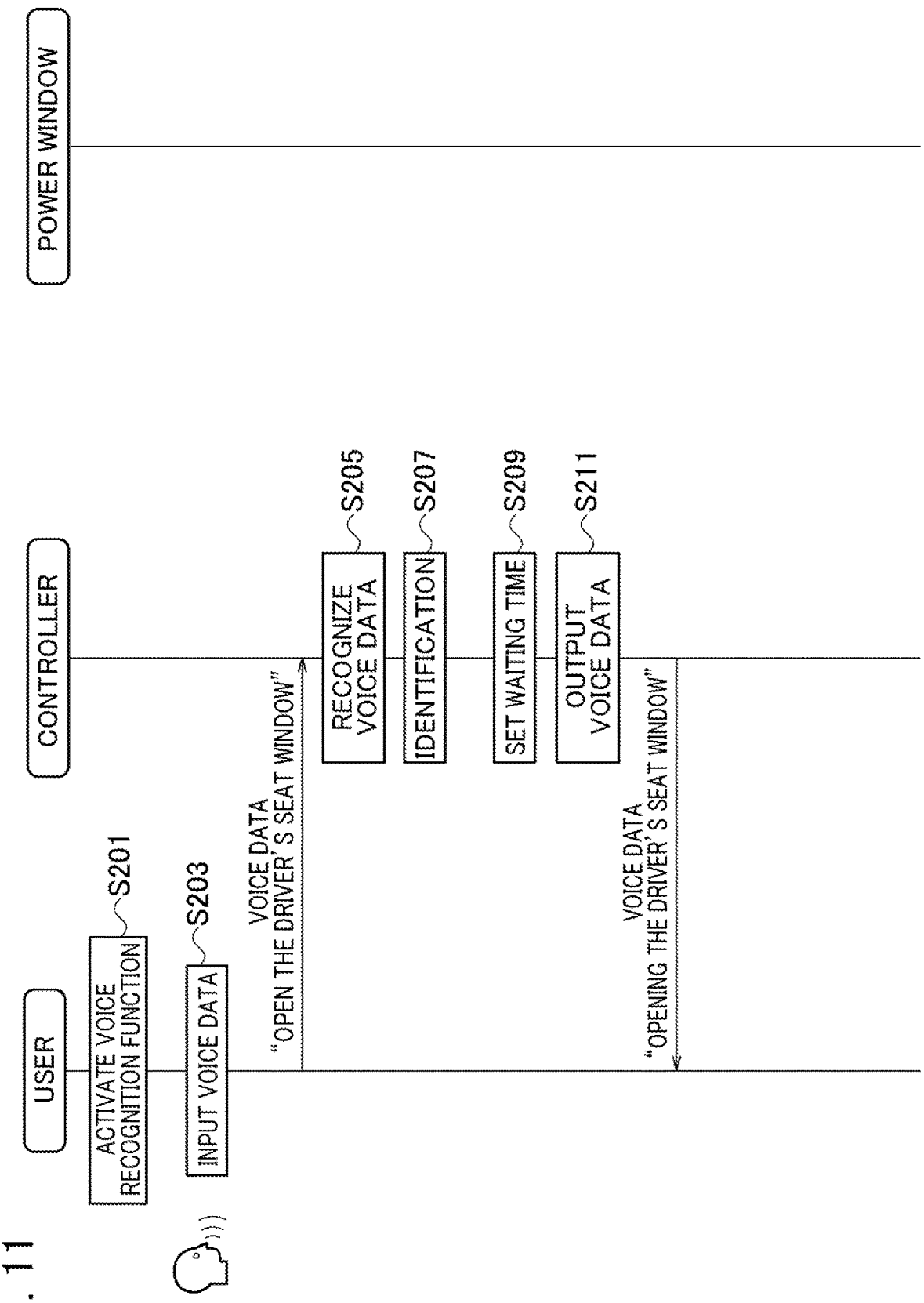
FIG. 11 is a sequence diagram for explaining one operation example of an information processing apparatus 2 according to a modified example of the present invention.
Figure 12:
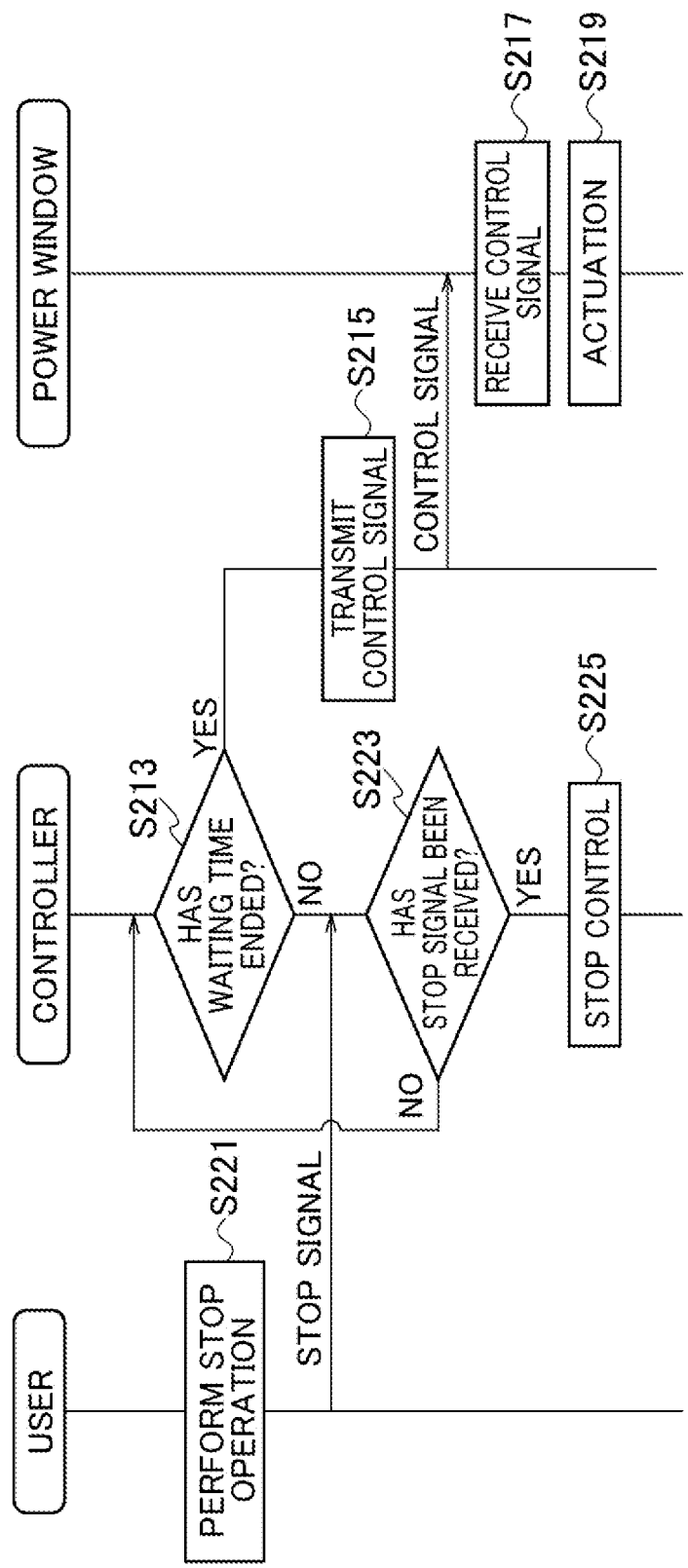
FIG. 12 is a sequence diagram for explaining one operation example of an information processing apparatus 2 according to a modified example of the present invention.

Next, an operation example of the information processing apparatus 2 will be described with reference to FIGS. 11 and 12.

However, since processing in steps S201 to S205, S211, and S215 to S225 is similar to the processing in steps S101 to S105, S107, and S111 to S121 shown in FIG. 2, the description thereof is omitted.

In step S207, the identification unit 25 receives, from the microphone 11, the touch panel 12, the switches 13, and the camera 14, signals indicating that the devices are operating normally. After receiving the signals, the identification unit 25 identifies that the devices are usable. The identification unit 25 transmits a signal indicating the identification result to the waiting time setting unit 26.

In step S209, the waiting time setting unit 26 sets the waiting time based on the signal received from the identification unit 25.

In step S213, the notification end determination unit 23 determines whether the waiting time has ended. If the notification end determination unit 23 receives a signal indicating that the waiting time has ended from the waiting time setting unit 26 after receiving the start signal from the voice output unit 22, the notification end determination unit 23 determines that the waiting time has ended. As an example, suppose that the notification by means of the voice output unit 22 is 2 seconds and the waiting time set by means of the waiting time setting unit 26 is 3 seconds. In the above case, the notification end determination unit 23 determines that the waiting time has ended at a time point 5 seconds after the start of the notification by means of the voice output unit 22. The end of the waiting time in step S213 means that the waiting time has ended without transmission of the stop signal from the user.

Action and Effect

The user data includes a plurality of types. Specifically, equipment capable of transmitting the stop signal includes a plurality of types (the microphone 11, the touch panel 12, the switches 13, and the camera 14). The controller 20 changes the time (the waiting time) during which the user data indicating that control of the predetermined equipment is to be stopped is accepted depending on the types of user data. According to the information processing apparatus 2 having this kind of configuration, unless the user transmits a stop instruction after giving feedback to the user, the information processing apparatus 2 performs the control quickly and automatically after the waiting time has elapsed. In addition, the types of user data are used to set the waiting time, and therefore it becomes possible to have settings that are suitable for the user interface.

It has been described that the waiting time is set depending on a usable device identified by means of the identification unit 25, but the waiting time is not limited thereto. The waiting time may be set depending on equipment corresponding to the user's instruction. If the user's instruction is "Open the driver's seat window" as described above, the equipment corresponding to the user's instruction is the power window 32. In another example, if the user's instruction is "Play the radio", the equipment corresponding to the user's instruction is the audio device 39. If the equipment corresponding to the user's instruction is equipment in which entrapment may occur, such as the power window 32, the sunroof 34, the power back door 36, or the power trunk 37, the waiting time thereof may be set to be longer compared to the waiting time of equipment in which entrapment does not occur. This allows the user to ensure the time used for determining whether to stop the instruction.

In addition, if equipment corresponding to the user's instruction is equipment that performs travel control such as automated driving, the waiting time of the equipment may be set to be longer than the waiting time of equipment that does not perform travel control. This is because, since the travel environment changes from time to time, time may be required for determining whether to stop an instruction regarding the travel control.

Further, the waiting time may be set depending on whether a vehicle is travelling or stopped. Specifically, if the vehicle is travelling, the waiting time may be set to be longer compared to when the vehicle is stopped. This is because it is expected that the user's response will be more delayed when the vehicle is travelling compared to when the vehicle is stopped.

Each function described in the above embodiment may be implemented by means of one or more processing circuits. The processing circuits include a programmed processing device such as a processing device including an electronic circuit. The processing circuits also include devices such as application specific integrated circuits (ASIC) and circuit components that are arranged to perform the described functions.

Although an embodiment of the invention has been described as described above, the discussion and drawings forming part of this disclosure should not be construed as limiting the invention. Various alternative embodiments, examples, and operational techniques will be apparent to those skilled in the art from this disclosure.

There is a case where a signal different from the stop signal is input from the user during the time period when the feedback voice data is being notified from the speaker 31, for example. The controller 20 may have a function of determining whether the signal input during the time period when the feedback voice data is being notified from the speaker 31 is the stop signal.

The controller 20 may accept user data indicating that control of the predetermined equipment is to be stopped only if the predetermined equipment is a device that operates mechanically or is a device that controls the in-vehicle environment. A device that operates mechanically is the power window 32, the sunroof 34, the power back door 36, or the power trunk 37. A device that controls the in-vehicle environment is the air conditioner 33. This allows the user to stop the control of the equipment in which entrapment may occur due to the equipment being activated and equipment that affects driving.

Navigation devices in recent years have many functions in addition to route guidance. Examples of the functions include provision of weather information, provision of news, and the like. Therefore, user's instructions that are input to the microphone 11 include instructions for requesting weather information, news, and the like.

The controller 20 does not need to accept the stop signal for instructions requesting weather information and news. This is because the provision of weather information and news does not include a mechanical operation or an operation that affects driving.

The microphone 11 is not limited to one which is installed in a vehicle. A microphone of a mobile terminal (for example, a smartphone) may be used instead. In this case, the mobile terminal is connected so as to be able to communicate with the controller 20.

REFERENCE SIGNS LIST 1, 2 Information processing apparatus
10 Input device
11 Microphone
12 Touch panel
13 Switch
14 Camera
20 Controller
21 Voice recognition unit
22 Voice output unit
23 Notification end determination unit
24 Control signal transmission unit
25 Identification unit
26 Waiting time setting unit
30 Database
31 Speaker

The invention claimed is:

1. An information processing apparatus comprising:
a voice data input device to which voice data is input;
a user data input device to which user data is input from a user; and
a controller,
wherein the controller
recognizes first voice data input to the voice data input device,
outputs second voice data indicating that predetermined equipment is to be controlled based on a recognition result of the first voice data,
sets a waiting time during which the user data indicating that control of the predetermined equipment is to be stopped is accepted after notification of the second voice data has ended depending on the predetermined equipment, and
controls the predetermined equipment based on the recognition result after the second voice data is notified, but stops controlling the predetermined equipment if user data indicating that control of the predetermined equipment is to be stopped is received during a time period when the second voice data is being notified or during the waiting time,
wherein if the predetermined equipment is equipment in which entrapment may occur or equipment that performs travel control, the waiting time thereof is set to be longer compared to the waiting time of equipment in which entrapment does not occur or equipment that does not perform travel control.

2. The information processing apparatus according to claim 1, wherein the predetermined equipment is mounted in a vehicle.

3. The information processing apparatus according to claim 2, wherein the predetermined equipment includes at least any one of a power window, an air conditioner, a sunroof, a sunshade, a power back door, a power trunk, a navigation device, and an audio device.

4. The information processing apparatus according to claim 1, wherein the notification by using the second voice data is a notification indicating that the predetermined equipment is to be controlled.

5. The information processing apparatus according to claim 1, wherein if the notification by using the second voice data ends without the controller receiving the user data indicating that control of the predetermined equipment is to be stopped, the controller controls the predetermined equipment.

6. The information processing apparatus according to claim 1, wherein the user data is data indicating that the user has operated a touch panel, data of an image obtained by capturing a posture of the user, data indicating that the user has operated a switch provided on a steering wheel, or the voice data input to the voice data input device.

7. The information processing apparatus according to claim 1, wherein after the second voice data is notified is defined as after output of the second voice data ends, and a time period during which the second voice data is being notified is defined as a time period from a start to an end of the output of the second voice data.

8. The information processing apparatus according to claim 6, wherein the user data includes a plurality of types, and the controller changes a time during which the user data indicating that control of the predetermined equipment is to be stopped is accepted depending on the types of the user data.

9. The information processing apparatus according to claim 1, wherein the controller accepts the user data indicating that control of the predetermined equipment is to be stopped only if the predetermined equipment is a device that operates mechanically or a device that controls an in-vehicle environment.

10. An information processing method comprising:
  recognizing first voice data input to a voice data input device;
  outputting second voice data indicating that predetermined equipment is to be controlled based on a recognition result of the first voice data;
  setting a waiting time during which user data indicating that control of the predetermined equipment is to be stopped is accepted after notification of the second voice data has ended depending on the predetermined equipment; and
  controlling the predetermined equipment based on the recognition result after the second voice data is notified, but stopping control of the predetermined equipment if the user data indicating that control of the predetermined equipment is to be stopped is input during a time period when the second voice data is being notified or during the waiting time,
  wherein if the predetermined equipment is equipment in which entrapment may occur or equipment that performs travel control, the waiting time thereof is set to be longer compared to the waiting time of equipment in which entrapment does not occur or equipment that does not perform travel control.

* * * * *